(12) United States Patent
Madge (10) Patent No.: US 10,815,900 B2
(45) Date of Patent: Oct. 27, 2020

(54) GEARED GAS TURBINE ENGINE

(71) Applicant: ROLLS-ROYCE plc, London (GB)

(72) Inventor: Jason J. Madge, Dursley (GB)

(73) Assignee: ROLLS-ROYCE plc, London (GB)

( * ) Notice: Subject to any disclaimer, the term of this patent is extended or adjusted under 35 U.S.C. 154(b) by 285 days.

(21) Appl. No.: 15/971,023

(22) Filed: May 4, 2018

(65) Prior Publication Data
US 2018/0328289 A1    Nov. 15, 2018

(30) Foreign Application Priority Data

May 9, 2017   (GB) .................................. 1707402.2

(51) Int. Cl.
*F02C 7/36* (2006.01)

(52) U.S. Cl.
CPC .......... *F02C 7/36* (2013.01); *F05D 2220/324* (2013.01); *F05D 2220/325* (2013.01); *F05D 2260/4023* (2013.01); *F05D 2260/40311* (2013.01)

(58) Field of Classification Search
CPC .............. F02C 7/36; F05D 2260/4023; F05D 2260/40311
See application file for complete search history.

(56) References Cited

U.S. PATENT DOCUMENTS

| | | | | |
|---|---|---|---|---|
| 3,287,903 | A | * | 11/1966 | Wickman .................. F02C 7/36 60/39.163 |
| 3,368,347 | A | * | 2/1968 | Wickman .................. F02C 7/36 60/791 |
| 3,729,276 | A | | 4/1973 | Boyadjieff et al. |
| 4,132,064 | A | | 1/1979 | Kumm |
| 4,699,021 | A | | 10/1987 | Waddington |
| 8,324,746 | B2 | | 12/2012 | Bradbrook |
| 2012/0294719 | A1 | | 11/2012 | Payne |
| 2014/0064915 | A1 | | 3/2014 | Masson et al. |
| 2017/0108084 | A1 | | 4/2017 | Chmylkowski |

FOREIGN PATENT DOCUMENTS

| | | |
|---|---|---|
| GB | 2199900 | 7/1988 |
| SU | 954672 | 8/1982 |
| WO | 2008105815 | 9/2008 |

OTHER PUBLICATIONS

Great Britain Search Report dated Sep. 29, 2017, issued in GB Patent Application No. 1707402.2.

* cited by examiner

*Primary Examiner* — Erin D Bishop
(74) *Attorney, Agent, or Firm* — Oliff PLC (57) ABSTRACT

A gas turbine engine comprises a gearbox including a first epicyclic gearbox and a second epicyclic gearbox. The first epicyclic gearbox comprises a first sun gear meshing with the first planet gears and the first planet gears meshing with a first annulus gear. The second epicyclic gearbox comprises a second sun gear meshing with the second planet gears and the second planet gears meshing with a second annulus gear. An input shaft is arranged to drive the first sun gear and a first planet gear carrier is arranged to drive a propulsor. The first and second annulus gears are fixed to a static structure. A first clutch is arranged between the first planet gear carrier and the second planet gear carrier and a second clutch is arranged between the second sun gear and the input shaft. The gearbox is more efficient at cruise conditions.

22 Claims, 8 Drawing Sheets

GEARED GAS TURBINE ENGINE

CROSS-REFERENCE TO RELATED APPLICATIONS

This disclosure claims the benefit of UK Patent Application No. GB 1707402.2, filed on 9 May 2017, which is hereby incorporated herein in its entirety.

FIELD OF THE DISCLOSURE

The present disclosure concerns a geared gas turbine engine and in particular to a geared turbofan gas turbine engine or a geared turbo propeller gas turbine engine.

BACKGROUND TO THE DISCLOSURE

Geared gas turbine engines have a gearbox to drive the fan or propeller. The gearbox may be an epicyclic gearbox, which comprises a sun gear, an annulus gear, a plurality of planet gears and a planet gear carrier and each planet gear is rotatably mounted in the planet gear carrier. An epicyclic gearbox may be arranged as a planetary gearbox in which the sun gear is driven to provide an input to drive the planetary gearbox, the annulus gear is fixed to a static structure and the planet gear carrier is driven by the planetary gearbox to provide an output to drive the fan or the propeller. An epicyclic gearbox may be arranged as a star gearbox in which the sun gear is driven to provide an input to drive the planetary gearbox, the planet gear carrier is fixed to a static structure and the annulus gear is driven by the planetary gearbox to provide an output to drive the fan or the propeller. An epicyclic gearbox may be arranged as a differential gearbox in which the sun gear is driven to provide an input to drive the differential gearbox, the planet gear carrier is driven by the differential gearbox to provide an output to drive to a fan or a propeller and the annulus gear is driven by the differential gearbox to provide an output to drive to a further fan or a further propeller. The sun gear is driven by a turbine of the geared gas turbine engine.

These gearboxes are used in geared gas turbine engines in order to improve the efficiency of the gas turbine engine by allowing the fan, or propeller, to operate at its ideal rotational speed and to allow the turbine to operate at its ideal rotating speed.

Conventionally, a single gearbox is designed, sized, such that the gearbox is able to transmit the full power capacity of the geared gas turbine engine. The torque/load capacity of a gearbox is a function of many things, but the greater the torque/load capacity of the gearbox the greater is the diameters and the face widths of the gears.

Generally, the full, or maximum, power capacity of the gearbox is only employed at the start of flight, during take-off and during cruise the gearbox is operating at a much lower power capacity.

Thus, at take-off the capacity of the gearbox is matched to the operating point and the efficiency of the gearbox is maximised at its maximum power output. Conversely, the efficiency of the gearbox is reduced at cruise conditions due to relatively large windage losses that occur operating a gearbox designed to operate at maximum power at lower power settings. As the majority of a flight is spent at cruise conditions, the gearbox is only operating at maximum efficiency for a relatively small proportion of the flight and is operating with reduced efficiency for a relatively large proportion of the flight and hence the fuel consumption of the geared gas turbine engine is higher than if the gearbox was operating at maximum efficiency all of the flight.

According to an aspect of the disclosure there is provided a gas turbine engine comprising a gearbox, the gearbox comprising a plurality of epicyclic gearboxes, each epicyclic gearbox comprising a sun gear, an annulus gear, a plurality of planet gears and a planet gear carrier, each planet gear of each epicyclic gearbox being rotatably mounted in the planet gear carrier of the corresponding epicyclic gearbox by at least one planet gear bearing, each epicyclic gearbox being arranged such that the sun gear meshes with the planet gears and the planet gears mesh with the annulus gear, an input shaft being arranged to drive the sun gear of one of the epicyclic gearboxes, one of the annulus gear and the planet gear carrier of said one of the epicyclic gearboxes being arranged to drive a propulsor, the other one of the planet gear carrier and the annulus gear of said one of the epicyclic gearboxes being fixed to a static structure, at least one first clutch, each first clutch is arranged between one of the annulus gear and the planet gear carrier of said one of the epicyclic gearboxes and the annulus gear or the planet gear carrier of a corresponding one of the other epicyclic gearboxes and at least one further clutch, each further clutch being arranged between the sun gear of each of the other epicyclic gearboxes and the input shaft. A bearing may be arranged between the sun gear of a corresponding one of the other epicyclic gearboxes and the input shaft.

The annulus gear of each epicyclic gearbox may be fixed to a static structure, the input shaft is arranged to drive the sun gear of one of the epicyclic gearboxes, the planet gear carrier of said one of the epicyclic gearboxes is arranged to drive the propulsor, each first clutch is arranged between the planet gear carrier of said one of the epicyclic gearboxes and the planet gear carrier of a corresponding one of the other epicyclic gearboxes and each further clutch is arranged between the sun gear of a corresponding one of the other epicyclic gearboxes and the input shaft. A bearing may be arranged between the sun gear of each of the other epicyclic gearboxes and the input shaft.

The planet gear carrier of each epicyclic gearbox may be fixed to the static structure, the input shaft is arranged to drive the sun gear of one of the epicyclic gearboxes, the annulus gear of said one of the epicyclic gearboxesis arranged to drive the propulsor, each first clutch is arranged between the annulus gear of said one of the epicyclic gearboxes and the annulus gear of a corresponding one of the other epicyclic gearboxes and each further clutch is arranged between the sun gear of a corresponding one of the other epicyclic gearboxes and the input shaft. A bearing may be arranged between the sun gear of each of the other epicyclic gearboxes and the input shaft.

The gearbox may comprise a first epicyclic gearbox and a second epicyclic gearbox, the first epicyclic gearbox comprising a first sun gear, a first annulus gear, a plurality of first planet gears and a first planet gear carrier, each first planet gear is rotatably mounted in the first planet gear carrier by at least one planet gear bearing, the first sun gear meshes with the first planet gears and the first planet gears mesh with the first annulus gear, the second epicyclic gearbox comprising a second sun gear, a second annulus gear, a plurality of second planet gears and a second planet gear carrier, each second planet gear is rotatably mounted in the second planet gear carrier by at least one planet gear bearing, the second sun gear meshes with the second planet gears and the second planet gears mesh with the second annulus gear, the input shaft is arranged to drive the first sun gear, the first planet carrier is arranged to drive the propulsor, the first annulus gear is fixed to the static structure, the second annulus gear is fixed to the static structure, a first clutch is arranged between the first planet gear carrier and the second planet gear carrier and a second clutch is arranged between the second sun gear and the input shaft. A bearing may be arranged between the second sun gear and the input shaft.

The gearbox may comprise a third epicyclic gearbox, the third epicyclic gearbox comprising a third sun gear, a third annulus gear, a plurality of third planet gears and a third planet gear carrier, each third planet gear is rotatably mounted in the third planet gear carrier by at least one planet gear bearing, the third sun gear meshes with the third planet gears and the third planet gears mesh with the third annulus gear, the third annulus gear is fixed to the static structure, a third clutch is arranged between the second planet gear carrier and the third planet gear carrier, a fourth clutch is arranged between the third sun gear and the input shaft. A bearing may be arranged between the third sun gear and the input shaft.

The gearbox may comprise a first epicyclic gearbox and a second epicyclic gearbox, the first epicyclic gearbox comprising a first sun gear, a first annulus gear, a plurality of first planet gears and a first planet gear carrier, each first planet gear is rotatably mounted in the first planet gear carrier by at least one planet gear bearing, the first sun gear meshes with the first planet gears and the first planet gears mesh with the first annulus gear, the second epicyclic gearbox comprising a second sun gear, a second annulus gear, a plurality of second planet gears and a second planet gear carrier, each second planet gear is rotatably mounted in the second planet gear carrier by at least one planet gear bearing, the second sun gear meshes with the second planet gears and the second planet gears mesh with the second annulus gear, the input shaft is arranged to drive the first sun gear, the first annulus gear is arranged to drive the propulsor, the first planet gear carrier is fixed to the static structure, the second planet gear carrier is fixed to the static structure, a first clutch is arranged between the first annulus gear and the second annulus gear and a second clutch is arranged between the second sun gear and the input shaft. A bearing may be arranged between the second sun gear and the input shaft.

The gearbox may comprise a third epicyclic gearbox, the third epicyclic gearbox comprising a third sun gear, a third annulus gear, a plurality of third planet gears and a third planet gear carrier, each third planet gear is rotatably mounted in the third planet gear carrier by at least one planet gear bearing, the third sun gear meshes with the third planet gears and the third planet gears mesh with the third annulus gear, the third planet gear carrier is fixed to the static structure, a third clutch is arranged between the second annulus gear and the third annulus gear and a fourth clutch is arranged between the third sun gear and the input shaft. A bearing may be arranged between the third sun gear and the input shaft.

A load sharing mechanism may be provided between the second annulus gear and the fixed structure or between the first annulus gear and the fixed structure. The load sharing device may comprise a hydraulic load sharing mechanism, a pneumatic load sharing mechanism, an electro-mechanical load sharing mechanism or a spring/stiffness based load sharing mechanism.

The hydraulic load sharing mechanism or the pneumatic load sharing mechanism may comprise a plurality of cylinders, a plurality of pistons and a supply of hydraulic fluid, or a supply of gas, the axes of the cylinders being arranged tangentially to the second annulus gear, each piston being arranged within a corresponding one of the cylinders to define a corresponding chamber and the chambers being connected to the supply of hydraulic fluid or the supply of gas.

The electro-mechanical load sharing mechanism may comprise a plurality of linear electrical actuators, the linear electrical actuators being arranged tangentially to the second annulus gear.

The first clutch may be friction clutch. The second clutch may be a friction clutch. The first clutch may comprise a releasable locking mechanism. The second clutch may comprise a releasable locking mechanism. The releasable locking mechanism or releasable locking mechanisms may comprise pins or teeth.

The pins, or teeth, of the releasable locking mechanism may form a dog clutch arrangement. The pins or teeth may be moved, slid, into engagement after the friction clutch has achieved synchronous speed between the relevant components. The advantage of the dog clutch is that the associated friction clutch does not need to be sized to transmit the full torque, but instead the friction clutch is sized, or has the capacity, to bring the relevant components to synchronous speed and the pins, or teeth, of the associated dog clutch engage to transmit the full torque. The pins or teeth of the friction clutch may be moved, slid, into engagement after the friction clutch has achieved synchronous speed between the two planet gear carriers and/or the pins or teeth of the further clutch may be moved, slid, into engagement after the further friction clutch has achieved synchronous speed between the sun gear of the other epicyclic gearbox and the input shaft.

The pins or teeth of the friction clutch may be moved, slid, into engagement after the friction clutch has achieved synchronous speed between the two annulus gear and/or the pins or teeth of the further clutch may be moved, slid, into engagement after the further friction clutch has achieved synchronous speed between the sun gear of the other epicyclic gearbox and the input shaft.

The first planet gear carrier may comprise a first ring, a second ring spaced axially from the first ring and a plurality of circumferentially spaced axles extending axially between the first ring and the second ring, each first planet gear being rotatably mounted on a respective one of the axles. Each first planet gear may be rotatably mounted on the first planet gear carrier by a journal bearing or at least one roller bearing.

Each first planet gear may be rotatably mounted on the first planet gear carrier by two roller bearings.

The second planet gear carrier may comprise a first ring, a second ring spaced axially from the first ring and a plurality of circumferentially spaced axles extending axially between the first ring and the second ring, each second planet gear being rotatably mounted on a respective one of the axles.

Each second planet gear may be rotatably mounted on the second planet gear carrier by a journal bearing or at least one roller bearing.

Each second planet gear may be rotatably mounted on the second planet gear carrier by two roller bearings.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

The gas turbine engine may comprise a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

The gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

The propulsor is a fan or a propeller.

The skilled person will appreciate that except where mutually exclusive, a feature described in relation to any one of the above aspects of the invention may be applied mutatis mutandis to any other aspect of the invention.

BRIEF DESCRIPTION OF THE DRAWINGS

Embodiments of the disclosure will now be described by way of example only, with reference to the Figures, in which.

DETAILED DESCRIPTION

Figure 1:
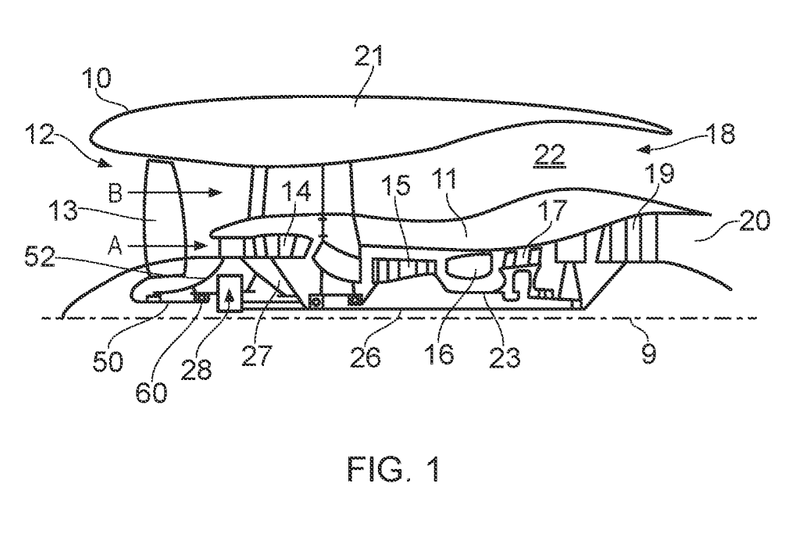
FIG. 1 is a part sectional side view of a geared turbofan gas turbine engine according to the present disclosure.
Figure 2:
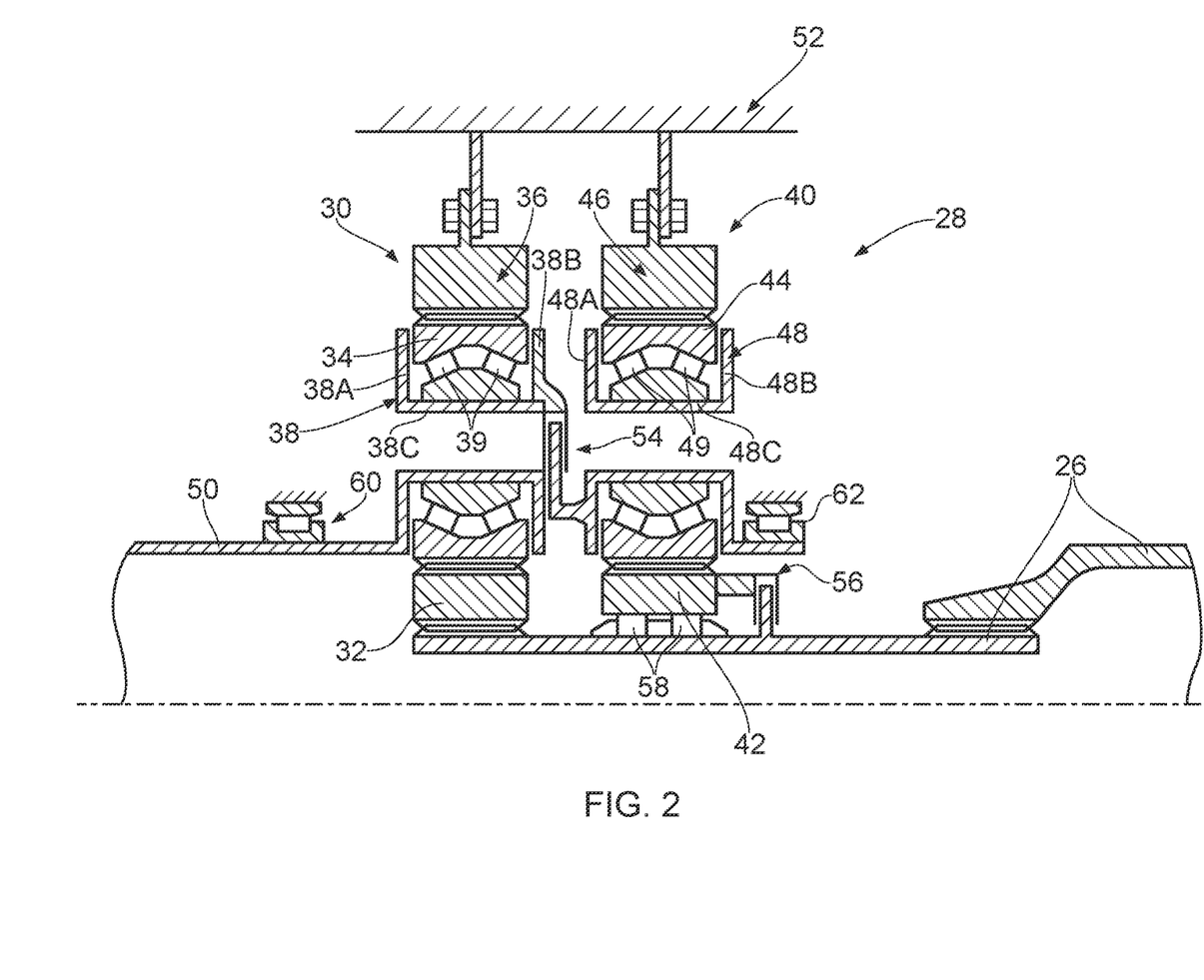
FIG. 2 is an enlarged part cross-sectional view of the gearbox of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is accelerated by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 50. The shaft 50 is rotatably mounted in a static structure 52 by a bearing 60.

The gearbox 28 as shown more clearly in FIG. 2 comprises a first epicyclic gearbox 30 and a second epicyclic gearbox 40. In this arrangement the first and second epicyclic gearboxes 30 and 40 are planetary gearboxes. The first epicyclic gearbox 30 comprises a first sun gear 32, a first annulus gear 36, a plurality of first planet gears 34 and a first planet gear carrier 38. Each first planet gear 34 is rotatably mounted in the first planet gear carrier 38 by at least one planet gear bearing 39. The first sun gear 32 meshes with the first planet gears 34 and the first planet gears 34 mesh with the first annulus gear 36. The second epicyclic gearbox 40 comprises a second sun gear 42, a second annulus gear 46, a plurality of second planet gears 44 and a second planet gear carrier 48. Each second planet gear 44 is rotatably mounted in the second planet gear carrier 48 by at least one planet gear bearing 49. The second sun gear 42 meshes with the second planet gears 44 and the second planet gears 44 mesh with the second annulus gear 46. The shaft 26, the input shaft, is arranged to drive the first sun gear 32, the first planet carrier 38 is arranged to drive the fan 13. The first planet gear carrier 38 is coupled via the shaft 50 to the fan 13 in order to drive its rotation about the engine axis 9. The first annulus gear 36 is coupled, or fixed, to a static structure 52 and the second annulus gear 46 is coupled, or fixed, to the static structure 52. A first clutch 54 is arranged between the first planet gear carrier 38 and the second planet gear carrier 48 and a second clutch 56 is arranged between the second sun gear 42 and the shaft, the input shaft, 26 and a bearing arrangement 58 is arranged between the second sun gear 42 and the shaft, the input shaft 26. In this embodiment the bearing arrangement 58 comprises two roller bearings, but other suitable bearings may be used. A flange on the first annulus gear 36 is removably secured, e.g. bolted, to a corresponding flange on the static structure 52 and a flange on the second annulus gear 46 is removably secured, e.g. bolted, to a corresponding flange on the static structure 52. The first clutch 54 is a friction clutch, but other suitable clutches may be used, for example a magnetic, or an electromagnetic, clutch. The second clutch 56 is a friction clutch, but other suitable clutches may be used, for example a magnetic, or an electromagnetic, clutch.

The first planet gear carrier 38 constrains the first planet gears 34 to precess around the sun gear 32 in synchronicity whilst enabling each first planet gear 34 to rotate about its own axis independently. The second planet gear carrier 48 constrains the second planet gears 44 to precess around the sun gear 42 in synchronicity whilst enabling each second planet gear 44 to rotate about its own axis independently. The axis of the first sun gear 32, the axis 42 of the second sun gear 42, the axis of the first annulus gear 36 and the axis of the second annulus gear 46, the axis of the first planet gear carrier 38 and the axis of the second planet gear carrier 48 are coaxial with the engine axis 9. The axes of the first planet gears 34 and the axes of the second planet gears 44 are arranged parallel to the engine axis 9.

The first planet gear carrier 38 comprises a first ring 38A, a second ring 38B spaced axially from the first ring 38A and a plurality of circumferentially spaced axles 38C which extend axially between the first ring 38A and the second ring 38B. Each first planet gear 34 is rotatably mounted on a respective one of the axles 38C. Each first planet gear 34 is rotatably mounted in the first planet gear carrier 38 by at least one planet gear bearing 39. In this particular embodiment each first planet gear 34 is rotatably mounted on the first planet gear carrier 38 by two roller bearings 39. Alternatively each first planet gear 34 may be rotatably mounted on the first planet gear carrier 38 by a journal bearing. The first planet gear carrier 38 is rotatably mounted on the static structure 52 by the bearing 60 via the shaft 50.

The second planet gear carrier 48 comprises a first ring 48A, a second ring 48B spaced axially from the first ring 48A and a plurality of circumferentially spaced axles 48C which extend axially between the first ring 48A and the second ring 48B. Each second planet gear 44 is rotatably mounted on a respective one of the axles 48C. Each second planet gear 44 is rotatably mounted in the second planet gear carrier 48 by at least one planet gear bearing 49. In this particular embodiment each second planet gear 44 is rotatably mounted on the second planet gear carrier 48 by two roller bearings 49. Alternatively each second planet gear 44 may be rotatably mounted on the second planet gear carrier 48 by a journal bearing. The second planet gear carrier 48 is rotatably mounted on the static structure 52 by a bearing 62. The bearings 60 and 62 are arranged at opposite axial ends of the gearbox 28.

In operation at maximum power, e.g. take-off, conditions of the geared gas turbine engine 10 the first and second epicyclic gearboxes 30 and 40 are working in parallel such that the required power, torque, is transmitted from the shaft 26 to the fan 13. However, at reduced power, e.g. cruise, conditions of the geared gas turbine engine 10 only the first epicyclic gearbox 30 is working such that the required power, torque, is transmitted from the shaft 26 to the fan 13.

At reduced power, e.g. cruise, conditions the second epicyclic gearbox 40 is disengaged and brought to rest such that there are no windage losses in the second epicyclic gearbox 40. In order to disengage the second epicyclic gearbox 40 the first clutch 54 is actuated to disengage the second planet gear carrier 48 from the first planet gear carrier 38 and the second clutch 56 is actuated to disengage the second sun gear 42 from the shaft 26, e.g. the second epicyclic gearbox 40 is disengaged from the input shaft 26 and is disengaged from the output shaft 50 due to the disengagement from the first planet gear carrier 38. In addition the second sun gear 42 is rotatably mounted on the shaft 26 by the bearing arrangement 58 to enable the shaft 26 to rotate freely with respect to the second sun gear 42.

Thus, the present disclosure provides a gearbox 28 comprising a first epicyclic gearbox 30 and a second epicyclic gearbox 40. The first and second epicyclic gearboxes 30 and 40 are arranged in parallel. In a first arrangement the first gearbox 30 is arranged to have sufficient power, or torque, transmission capacity for reduced power, e.g. cruise, conditions of the geared gas turbine engine 10 and the second epicyclic gearbox 40 is arranged to have sufficient power, or torque, transmission capacity to provide the difference between maximum power, e.g. take-off, conditions and reduced power, e.g. cruise, conditions of the geared gas turbine engine 10. In the first arrangement the first and second gearboxes 30 and 40 have different power, or torque, transmission capacity except in the case that the reduced power is half of maximum power. In a second arrangement the first and second gearboxes 30 and 40 are arranged to have substantially the same power, or torque, transmission capacity. In the second arrangement each of the first and second gearboxes 30 and 40 is arranged to have sufficient power, or torque, transmission capacity for reduced power, e.g. cruise, conditions of the geared gas turbine engine 10.

The second arrangement has an advantage, a safety benefit, that in the unlikely event of one of the epicyclic gearboxes 30 or 40 suffering a failure the other epicyclic gearbox 40 or 30 may be used alone to power the geared gas turbine engine 10. If the first epicyclic gearbox 30 suffered a seizure it is necessary to disengage the first epicyclic gearbox 30. A clutch may be provided between the sun gear 32 of the first epicyclic gearbox 30 and the shaft 26 to disengage the first epicyclic gearbox 30.

Figure 3:
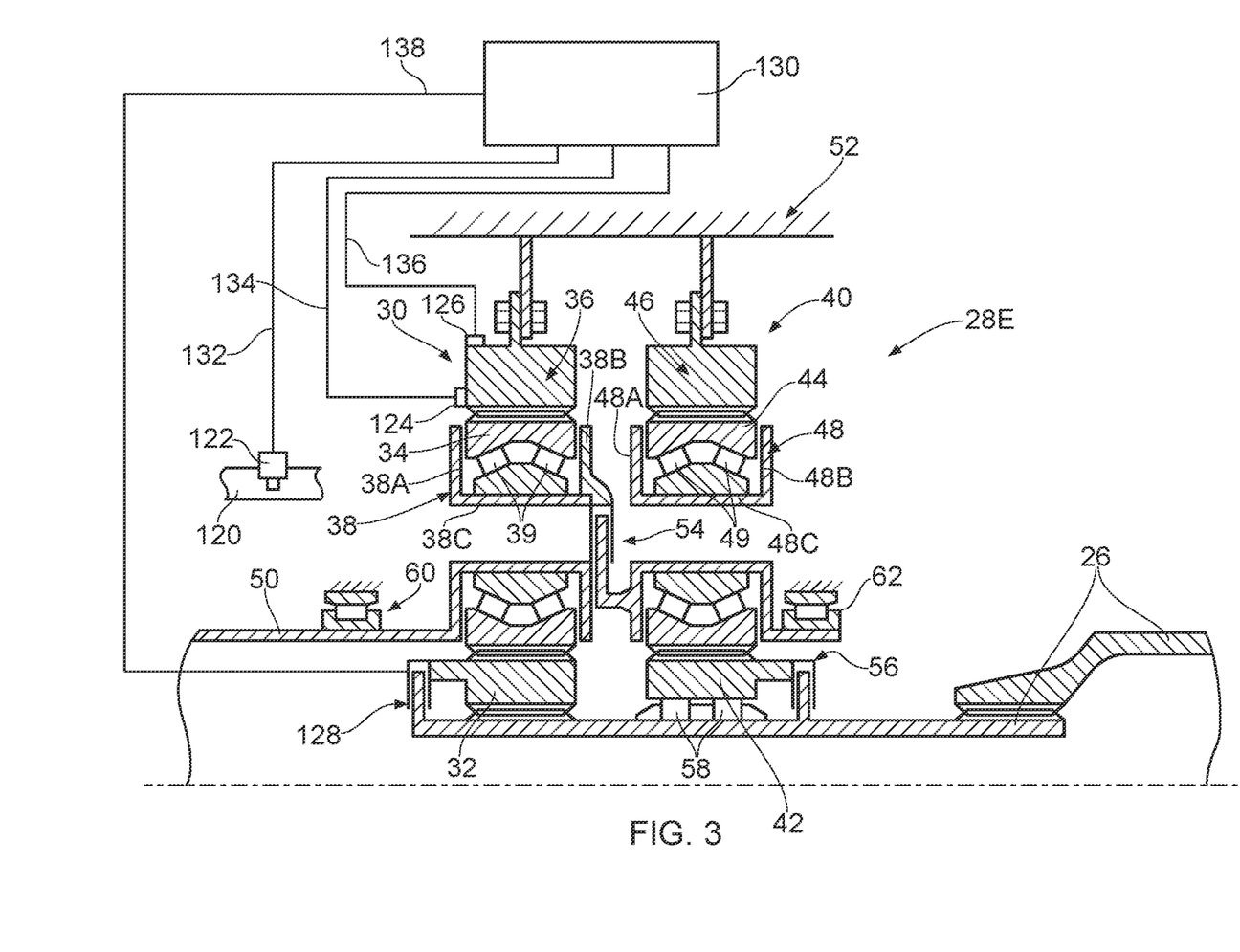
FIG. 3 is an alternative enlarged cross-sectional of the gearbox of the geared turbofan gas turbine engine shown in FIG. 1.

FIG. 3 shows an alternative gearbox 28E. The gearbox 28E is substantially the same as the gearbox 28 shown in FIG. 2 and like parts are denoted by like numerals. The gearbox 28E has one or more sensors to detect wear, or malfunction, of the first epicyclic gearbox 30 before failure. The first epicyclic gearbox 30 may be provided with at least one magnetic chip detector 122 to detect metal particles within the lubricant supply 120 for the first epicyclic gearbox 30, at least one temperature sensor 124 to detect the temperature and hence an increase in the operating temperature of the first epicyclic gearbox 30 or at least one vibration detector 126 to detect vibrations and hence an increase in vibration of the first epicyclic gearbox 30. The at least one magnetic chip detector 122 sends signals to a processor 130 via an electrical cable 132, the at least one temperature sensor 124 sends signals to the processor 130 via an electrical cable 134 and the at least one vibration sensor 126 sends signals to the processor 130 via an electrical cable 136. The processor 130 is arranged to analyse the signal from the at least one chip detector 122, the at least one temperature sensor 124 or the at least one vibration detector 126 by comparing the relevant signal with a predetermined level. If the amount of metal particles detected by the magnetic chip detector, or magnetic chip detectors, 122 is above a predetermined level this is taken as an indication of wear or malfunction of the first epicyclic gearbox 30. If the operating temperature of the epicyclic gearbox 30 detected by the temperature sensor, or temperature sensors, 124 is above a predetermined level this is taken as an indication of wear or malfunction of the first epicyclic gearbox 30. If the vibration of the epicyclic gearbox 30 detected by the vibration detector, or vibration detectors, 126 is above a predetermined level this is taken as an indication of wear or malfunction of the first epicyclic gearbox 30. It may be possible to use a combination of one or more magnetic chip detectors 122 and one or more temperature sensors 124, a combination of one or more magnetic chip detectors 122 and one or more vibration detectors 126, a combination of one or more temperature sensors 124 and one or more vibration detectors 126 or a combination of one or more magnetic chip detectors 122, one or more temperature sensors 124 and one or more vibration detectors 126 to detect wear or malfunction of the first epicyclic gearbox 30. If wear, or malfunction, of the first epicyclic gearbox 30 is detected the second epicyclic gearbox 40 is used to transmit power to the fan 13 before the first epicyclic gearbox 30 fails and the first epicyclic gearbox 30 is allowed to rotate but transmits low levels of power to the fan 13. Alternatively, if wear, or malfunction, of the first epicyclic gearbox 30 is detected the second epicyclic gearbox 40 is used to transmit power to the fan 13 before the first epicyclic gearbox 30 fails and then the clutch 128 between the sun gear 36 of the first epicyclic gearbox 30 and the input shaft 26 is operated to disengage the first epicyclic gearbox 30. The processor 130 sends signals to the clutch 128 via electric, hydraulic, pneumatic or mechanical transmission 138 to disengage the sun gear 32 from the input shaft 26.

Figure 4:
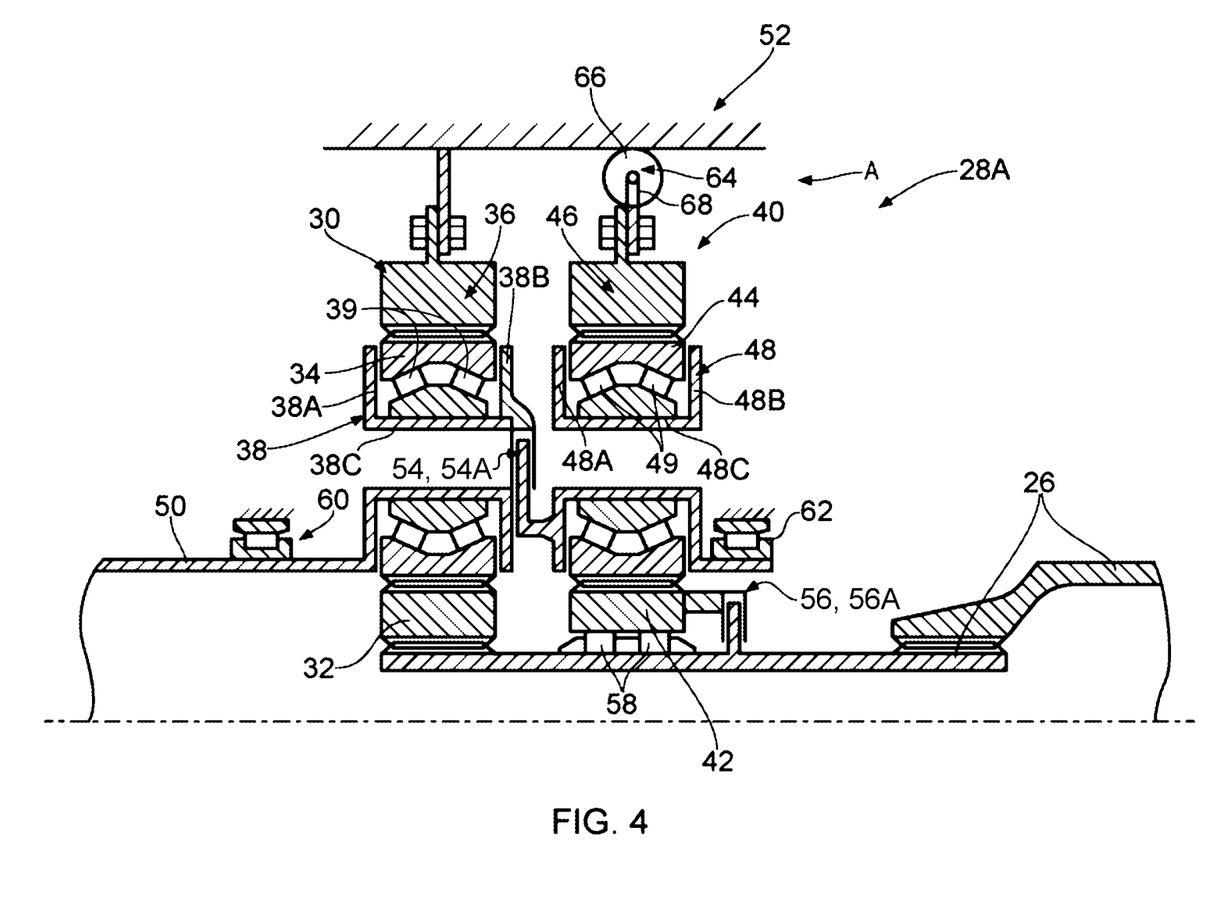
FIG. 4 is an alternative enlarged cross-sectional of the gearbox of the geared turbofan gas turbine engine shown in FIG. 1.
Figure 5:
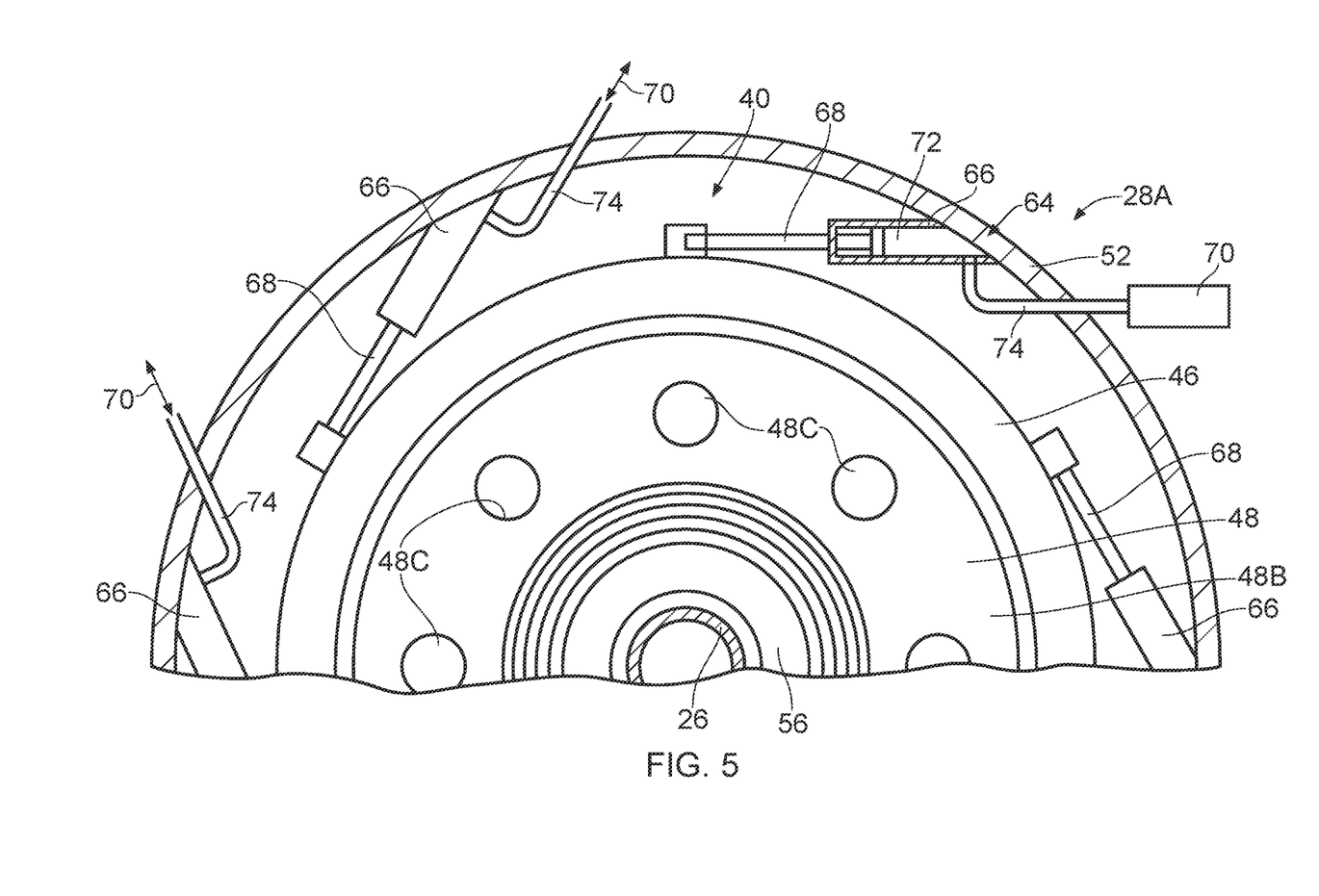
FIG. 5 is view in the direction of arrow A in FIG. 4.

An alternative gearbox 28A is shown more clearly in FIGS. 4 and 5. The gearbox 28A is substantially the same as the gearbox 28 shown in FIG. 2 and like parts are denoted by like numerals. The gearbox 28A differs in that a load sharing mechanism 64 is provided. The load sharing mechanism 64 is provided between the second annulus gear 46 and the static structure 52. The load sharing mechanism 64 may comprise a hydraulic load sharing mechanism, a pneumatic load sharing mechanism or an electro-mechanical load sharing mechanism. The load sharing mechanism 64 shown in FIGS. 4 and 5 comprises a hydraulic, or a pneumatic, load sharing mechanism which comprises a plurality of cylinders 66, a plurality of pistons 68 and a supply of hydraulic, or pneumatic, fluid 70. The axes of the cylinders 66 are arranged tangentially to the second annulus gear 46, each piston 68 is arranged within a corresponding one of the cylinders 66 to define a corresponding chamber 72 and the chambers 72 are connected to the supply of hydraulic, or pneumatic, fluid 70 via fluid conduits 74. The supply of hydraulic, or pneumatic, fluid 70 is able to supply hydraulic or pneumatic fluid at high pressure.

The load sharing mechanism 64 is able to actively control the torque load acting on each of the first and second epicyclic gearboxes 30 and 40. The load sharing mechanism 64 provides two functions for the gearbox 28A. Firstly, the load sharing mechanism 64 ensures that at a stable operating condition the load going through each of the first and second epicyclic gearboxes 30 and 40 is controlled and known and prevents either one or the other of the first and second epicyclic gearboxes 30 and 40 from being overloaded. Secondly, the load sharing mechanism 64 enables the power of the gearbox 28A to be reduced while the first and second clutches 54 and 56 are being engaged or dis-engaged. Generally, clutch wear and heat generation is significantly increased by application of torque load when the shafts/components at either, both, sides of the clutch are not rotating at synchronous speeds. The load sharing mechanism 64 therefore reduces wear of the clutches 54 and 56 and increases the reliability of the clutches 54 and 56. The load sharing mechanism 64 is able to apply a torque load to the second annulus gear 46 of the second epicyclic gearbox 40 of the gearbox 28A and thus alter the reaction torque experienced by the second annulus gear 46. Therefore, as the clutches 54 and 56 are engaged only a small amount of power flows through the second epicyclic gearbox 40 and thus the clutches 54 and 56 are only required to transmit the torque necessary to accelerate the second epicyclic gearbox 40 up to the required rotational speed. When the second epicyclic gearbox 40 has reached the same rotational speed as the first epicyclic gearbox 30 the load sharing mechanism 64 is activated to apply load through the second epicyclic gearbox 40 because the clutches 54 and 56 are no longer slipping.

Alternatively, it may be possible to provide the load sharing mechanism 64 between the first annulus gear 36 and the static structure 52.

The gearbox 28A may be arranged such that if the first epicyclic gearbox 30 suffered a seizure a clutch may be provided between the sun gear 32 of the first epicyclic gearbox 30 and the shaft 26 to disengage the first epicyclic gearbox 30. Alternatively, the gearbox 28A may be provided with one or more magnetic chip detectors to detect metal particles within the lubricant supply for the first epicyclic gearbox 30, one or more temperature sensors to detect the temperature and hence an increase in the operating temperature of the first epicyclic gearbox 30 or one or more vibration detectors to detect vibrations and hence an increase in vibration of the first epicyclic gearbox 30 as described above.

Figure 6:
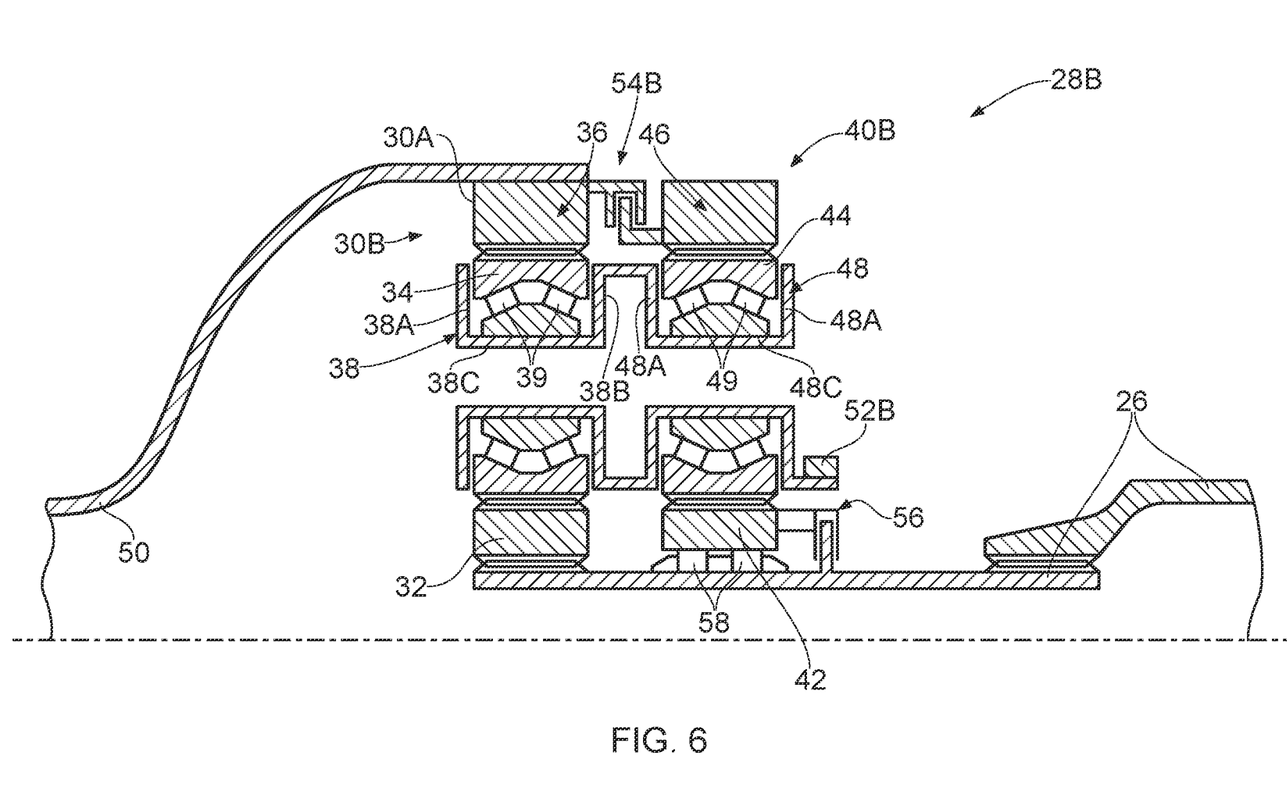
FIG. 6 is another alternative enlarged cross-sectional of the gearbox of the geared turbofan gas turbine engine shown in FIG. 1.

Another gearbox 28B is shown more clearly in FIG. 6. The gearbox 28B is substantially the same as the gearbox 28 shown in FIG. 2 and like parts are denoted by like numerals. The gearbox 28B also comprises a first epicyclic gearbox 30B and a second epicyclic gearbox 40B. The gearbox 28B differs in that the first and second epicyclic gearboxes 30B and 40B are star gearboxes. The shaft 26, the input shaft, is arranged to drive the first sun gear 32, the first annulus gear 36 is arranged to drive the fan 13. The first annulus gear 36 is coupled via the shaft 50 to the fan 13 in order to drive its rotation about the engine axis 9. The first planet gear carrier 38 is coupled, or fixed, to a static structure 52B and the second planet gear carrier 48 is coupled, or fixed, to the static structure 52B. In this example the first planet gear carrier 38 is coupled to the second planet gear carrier 48. A first clutch 54B is arranged between the first annulus gear 36 and the second annulus gear 46 and a second clutch 56 is arranged between the second sun gear 42 and the shaft, the input shaft, 26 and a bearing arrangement 58 is arranged between the second sun gear 42 and the shaft, the input shaft 26. In this embodiment the bearing arrangement 58 comprises two roller bearings, but other suitable bearings may be used. The first clutch 54B is a friction clutch, but other suitable clutches may be used, for example a magnetic, or an electromagnetic, clutch. The second clutch 56 is a friction clutch, but other suitable clutches may be used, for example a magnetic, or an electromagnetic, clutch.

The gearbox 28B works in substantially the same way as the embodiment in FIG. 2. The gearbox 28B may be arranged such that if the first epicyclic gearbox 30 suffered a seizure a clutch may be provided between the sun gear 32 of the first epicyclic gearbox 30 and the shaft 26 to disengage the first epicyclic gearbox 30. Alternatively, the gearbox 28B may be provided with one or more magnetic chip detectors to detect metal particles within the lubricant supply for the first epicyclic gearbox 30, one or more temperature sensors to detect the temperature and hence an increase in the operating temperature of the first epicyclic gearbox 30 or one or more vibration detectors to detect vibrations and hence an increase in vibration of the first epicyclic gearbox 30 as described above.

Figure 7:
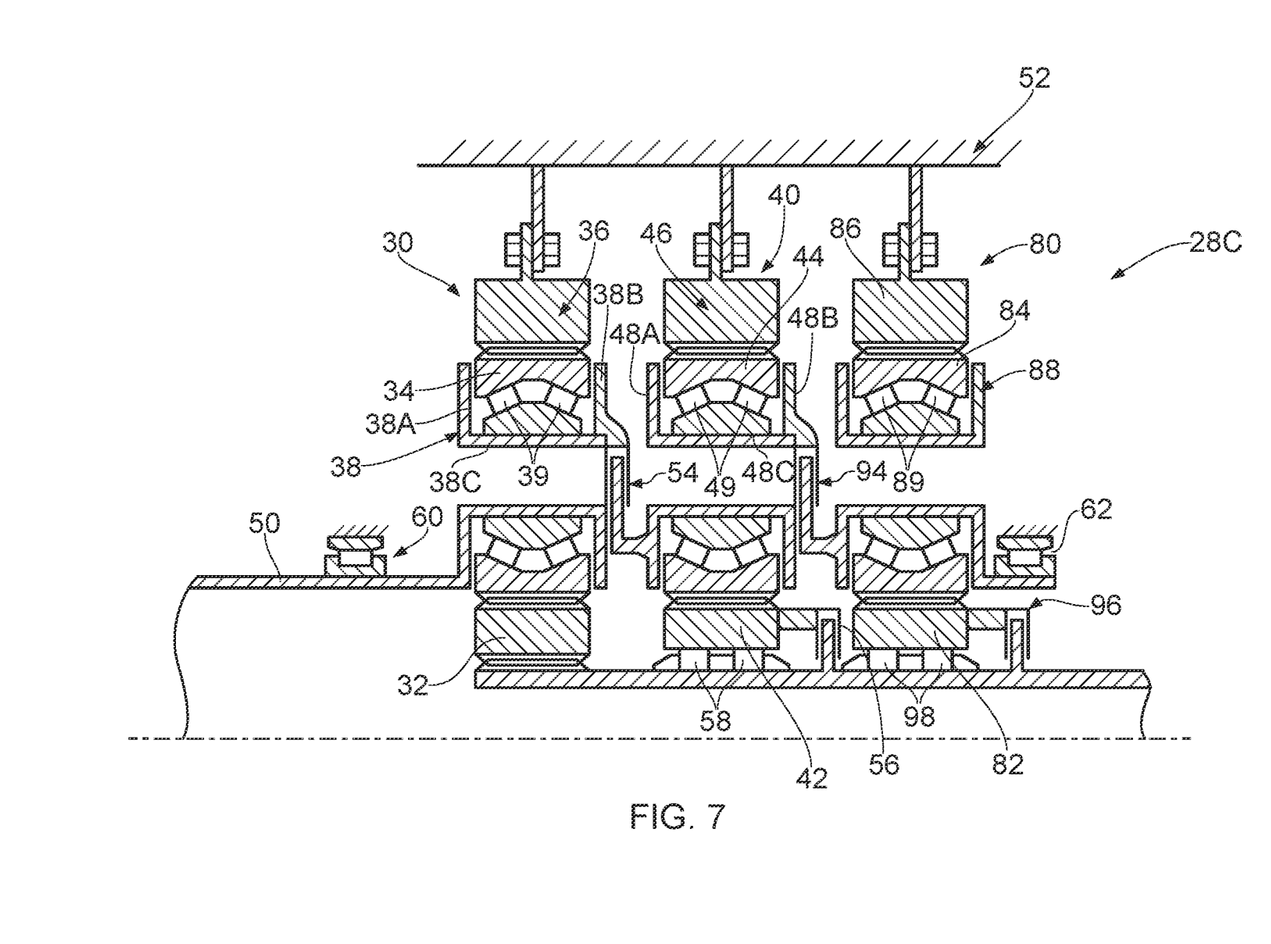
FIG. 7 is a further alternative enlarged cross-sectional of the gearbox of the geared turbofan gas turbine engine shown in FIG. 1.

A further gearbox 28C is shown more clearly in FIG. 7. The gearbox 28C is similar to the gearbox 28 shown in FIG. 2 and like parts are denoted by like numerals. The gearbox 28C also comprises a first epicyclic gearbox 30 and a second epicyclic gearbox 40. The gearbox 28C differs in that is also comprises a third epicyclic gearbox 80 and the third epicyclic gearbox 80 is also a planetary gearbox. The third epicyclic gearbox 30 comprises a third sun gear 82, a third annulus gear 86, a plurality of third planet gears 84 and a third planet gear carrier 88. Each third planet gear 84 is rotatably mounted in the third planet gear carrier 88 by at least one planet gear bearing 89. The third sun gear 82 meshes with the third planet gears 84 and the third planet gears 84 mesh with the third annulus gear 86. A third clutch 94 is arranged between the third planet gear carrier 88 and the second planet gear carrier 48 and a fourth clutch 96 is arranged between the third sun gear 82 and the shaft, the input shaft, 26 and a bearing arrangement 98 is arranged between the third sun gear 82 and the shaft, the input shaft 26. In this embodiment the bearing arrangement 98 comprises two roller bearings, but other suitable bearings may be used. A flange on the third annulus gear 86 is removably secured, e.g. bolted, to a corresponding flange on the static structure 52. The third clutch 94 is a friction clutch, but other suitable clutches may be used, for example a magnetic, or an electromagnetic, clutch. The fourth clutch 96 is a friction clutch, but other suitable clutches may be used, for example a magnetic, or an electromagnetic, clutch.

The axis of the third sun gear 82, the axis of the third annulus gear 86 and the axis of the third planet gear carrier 88 are also coaxial with the engine axis 9. The axes of the third planet gears 84 are arranged parallel to the engine axis 9.

The third planet gear carrier 88 comprises a first ring 88A, a second ring 88B spaced axially from the first ring 88A and a plurality of circumferentially spaced axles 88C which extend axially between the first ring 88A and the second ring 88B. Each third planet gear 84 is rotatably mounted on a respective one of the axles 88C. Each third planet gear 84 is rotatably mounted in the third planet gear carrier 88 by at least one planet gear bearing 89. In this particular embodiment each third planet gear 84 is rotatably mounted on the third planet gear carrier 88 by two roller bearings 89. Alternatively each third planet gear 84 may be rotatably mounted on the third planet gear carrier 88 by a journal bearing. The third planet gear carrier 88 is rotatably mounted on the static structure 52 by the bearing 62. The second planet gear carrier 48 is rotatably mounted on the static structure 52 by at least one bearing (not shown), for example one bearing may be arranged axially between the first and second planet gear carriers 38 and 48 and one bearing may be arranged between the second and third planet gear carriers 48 and 88.

In operation at maximum power, e.g. take-off, conditions of the geared gas turbine engine 10 the first, second and third epicyclic gearboxes 30, 40 and 80 are working in parallel such that the required power, torque, is transmitted from the shaft 26 to the fan 13. However, at reduced power, e.g. cruise, conditions of the geared gas turbine engine 10 only the first epicyclic gearbox 30 is, or only the first and second epicyclic gearboxes 30 and 40 are, working such that the required power, torque, is transmitted from the shaft 26 to the fan 13. The first, second and third epicyclic gearboxes 30, 40 and 80 transmit substantially the same power, or torque, to the fan 13, because they are substantially identical. At reduced power, e.g. cruise, conditions the first and second epicyclic gearboxes 40 and 80 are, or the third epicyclic gearbox 80 is, disengaged and brought to rest such that there are no windage losses in the second and third epicyclic gearboxes 40 and 80 or the third epicyclic gearbox 80 respectively. In order to disengage the second epicyclic gearbox 40 the first clutch 54 is actuated to disengage the second planet gear carrier 48 from the first planet gear carrier 38 and the second clutch 56 is actuated to disengage the second sun gear 42 from the shaft 26, e.g. the second epicyclic gearbox 40 is disengaged from the input shaft 26 and is disengaged from the output shaft 50 due to the disengagement from the first planet gear carrier 38. In addition the second sun gear 42 is rotatably mounted on the shaft 26 by the bearing arrangement 58 to enable the shaft 26 to rotate freely with respect to the second sun gear 42. In order to disengage the third epicyclic gearbox 80 the third clutch 94 is actuated to disengage the third planet gear carrier 88 from the second planet gear carrier 48 and the fourth clutch 96 is actuated to disengage the third sun gear 82 from the shaft 26, e.g. the third epicyclic gearbox 80 is disengaged from the input shaft 26 and is disengaged from the output shaft 50 due to the disengagement from the first planet gear carrier 38. In addition the third sun gear 82 is rotatably mounted on the shaft 26 by the bearing arrangement 98 to enable the shaft 26 to rotate freely with respect to the third sun gear 82.

The gearbox 28C may be arranged such that if the first epicyclic gearbox 30 suffered a seizure a clutch may be provided between the sun gear 32 of the first epicyclic gearbox 30 and the shaft 26 to disengage the first epicyclic gearbox 30. Alternatively, the gearbox 28C may be provided with one or more magnetic chip detectors to detect metal particles within the lubricant supply for the first epicyclic gearbox 30, one or more temperature sensors to detect the temperature and hence an increase in the operating temperature of the first epicyclic gearbox 30 or one or more vibration detectors to detect vibrations and hence an increase in vibration of the first epicyclic gearbox 30 as described above.

Figure 8:
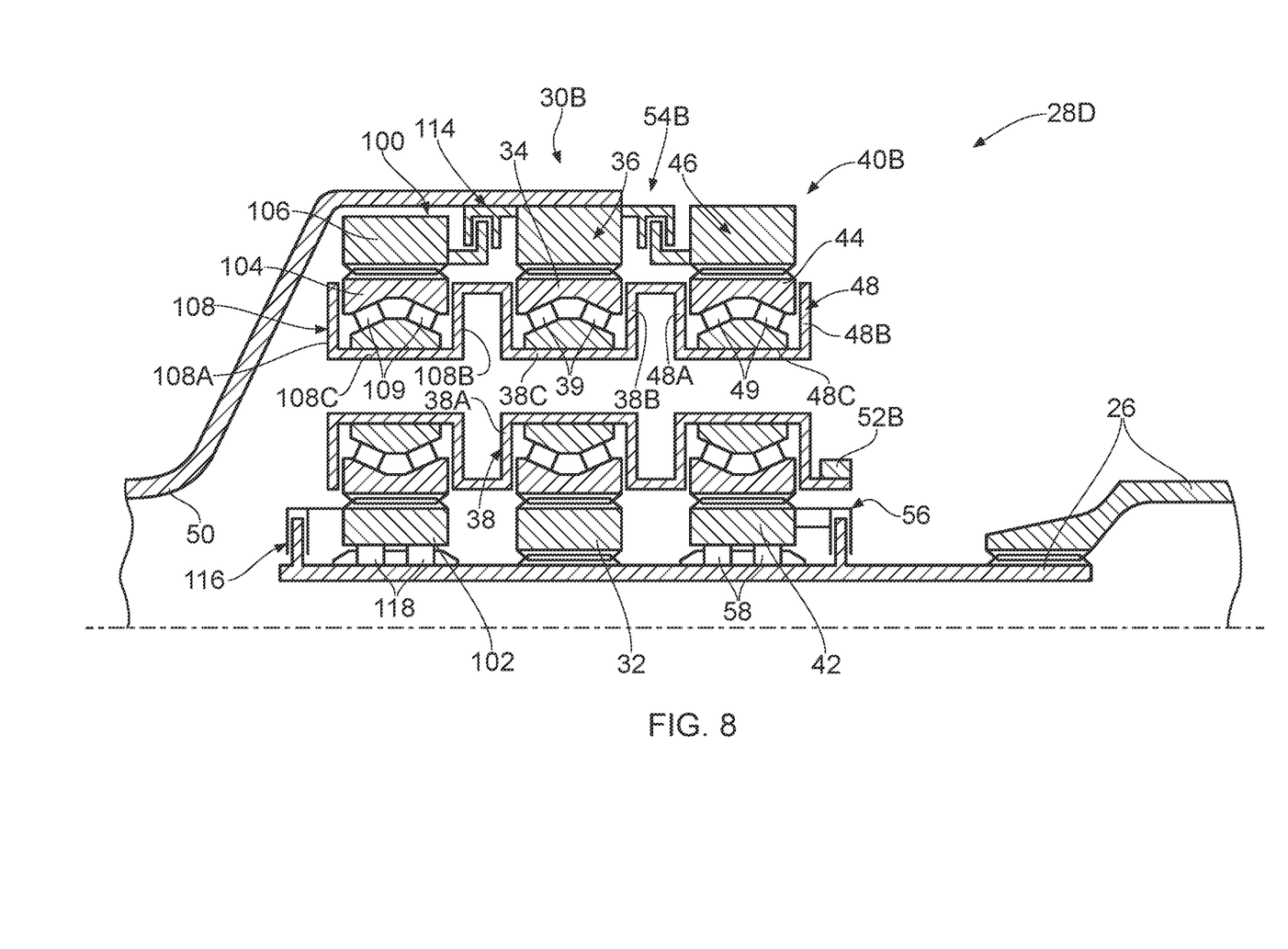
FIG. 8 is an additional alternative enlarged cross-sectional of the gearbox of the geared turbofan gas turbine engine shown in FIG. 1.

An additional gearbox 28D is shown more clearly in FIG. 8. The gearbox 28D is similar to the gearbox 28B shown in FIG. 6 and like parts are denoted by like numerals. The gearbox 28D also comprises a first epicyclic gearbox 30B and a second epicyclic gearbox 40B. The gearbox 28D differs in that is also comprises a third epicyclic gearbox 100 and the third epicyclic gearbox 100 is also a star gearbox. The third epicyclic gearbox 100 comprises a third sun gear 102, a third annulus gear 106, a plurality of third planet gears 104 and a third planet gear carrier 108. Each third planet gear 104 is rotatably mounted in the third planet gear carrier 108 by at least one planet gear bearing 109. The third sun gear 102 meshes with the third planet gears 104 and the third planet gears 104 mesh with the third annulus gear 106. A third clutch 114 is arranged between the third annulus gear 106 and the first annulus gear 36 and a fourth clutch 116 is arranged between the third sun gear 102 and the shaft, the input shaft, 26 and a bearing arrangement 118 is arranged between the third sun gear 102 and the shaft, the input shaft 26. In this embodiment the bearing arrangement 118 comprises two roller bearings, but other suitable bearings may be used. The third clutch 114 is a friction clutch, but other suitable clutches may be used, for example a magnetic, or an electromagnetic, clutch. The fourth clutch 116 is a friction clutch, but other suitable clutches may be used, for example a magnetic, or an electromagnetic, clutch.

The axis of the third sun gear 102, the axis of the third annulus gear 106 and the axis of the third planet gear carrier 108 are also coaxial with the engine axis 9. The axes of the third planet gears 104 are arranged parallel to the engine axis 9.

The third planet gear carrier 108 comprises a first ring 108A, a second ring 108B spaced axially from the first ring 108A and a plurality of circumferentially spaced axles 108C which extend axially between the first ring 108A and the second ring 108B. Each third planet gear 104 is rotatably mounted on a respective one of the axles 108C. Each third planet gear 104 is rotatably mounted in the third planet gear carrier 108 by at least one planet gear bearing 109. In this particular embodiment each third planet gear 104 is rotatably mounted on the third planet gear carrier 108 by two roller bearings 109. Alternatively each third planet gear 104 may be rotatably mounted on the third planet gear carrier 108 by a journal bearing. The first planet gear carrier 38 is coupled, or fixed, to a static structure 52B and the third planet gear carrier 108 is coupled, or fixed, to the static structure 52B. In this example the first planet gear carrier 38 is coupled to the third planet gear carrier 108. It is seen that the first epicyclic gearbox 30B is located axially between the second epicyclic gearbox 40B and the third epicyclic gearbox 100. However, in another arrangement it is possible to have the second epicyclic gearbox 40B located axially between the first epicyclic gearbox 30B and the third epicyclic gearbox 100.

In operation at maximum power, e.g. take-off, conditions of the geared gas turbine engine 10 the first, second and third epicyclic gearboxes 30B, 40B and 100 are working in parallel such that the required power, torque, is transmitted from the shaft 26 to the fan 13. However, at reduced power, e.g. cruise, conditions of the geared gas turbine engine 10 only the first epicyclic gearbox 30B is, or only the first and second epicyclic gearboxes 30B and 40B are, working such that the required power, torque, is transmitted from the shaft 26 to the fan 13. The first, second and third epicyclic gearboxes 30B, 40B and 100 transmit substantially the same power, or torque, to the fan 13, because they are substantially identical. At reduced power, e.g. cruise, conditions the first and second epicyclic gearboxes 40B and 100 are, or the third epicyclic gearbox 100 is, disengaged and brought to rest such that there are no windage losses in the second and third epicyclic gearboxes 40B and 100 or the third epicyclic gearbox 100 respectively. In order to disengage the second epicyclic gearbox 40B the first clutch 54B is actuated to disengage the second annulus gear 46 from the first annulus gear 36 and the second clutch 56 is actuated to disengage the second sun gear 42 from the shaft 26, e.g. the second epicyclic gearbox 40B is disengaged from the input shaft 26 and is disengaged from the output shaft 50 due to the disengagement from the first annulus gear 36. In addition the second sun gear 42 is rotatably mounted on the shaft 26 by the bearing arrangement 58 to enable the shaft 26 to rotate freely with respect to the second sun gear 42. In order to disengage the third epicyclic gearbox 100 the third clutch 114 is actuated to disengage the third annulus gear 106 from the first annulus gear 36 and the fourth clutch 116 is actuated to disengage the third sun gear 102 from the shaft 26, e.g. the third epicyclic gearbox 100 is disengaged from the input shaft 26 and is disengaged from the output shaft 50 due to the disengagement from the first annulus gear 36. In addition the third sun gear 102 is rotatably mounted on the shaft 26 by the bearing arrangement 118 to enable the shaft 26 to rotate freely with respect to the third sun gear 102.

It may be possible to provide a load sharing mechanism 64 as shown and described with reference to FIGS. 4 and 5 in the gearbox 28B shown in FIG. 6, but the load sharing mechanism 64 would be provided between the second planet gear carrier 48 and the static structure 52. It may also be possible to provide load sharing mechanisms 64 as shown and described with reference to FIGS. 4 and 5 in the gearbox 28C shown in FIG. 7, but a load sharing mechanism 64 would be provided between the second annulus gear 46 and the static structure 52 and/or a load sharing mechanism 64 would be provided between the third planet gear carrier 88 and the static structure 52. It may also be possible to provide load sharing mechanisms 64 as shown and described with reference to FIGS. 4 and 5 in the gearbox 28C shown in FIG. 8, but a load sharing mechanism 64 would be provided between the second planet gear carrier 48 and the static structure 52 and/or a load sharing mechanism 64 would be provided between the third planet gear carrier 108 and the static structure 52.

The gearbox 28D may be arranged such that if the first epicyclic gearbox 30 suffered a seizure a clutch may be provided between the sun gear 32 of the first epicyclic gearbox 30 and the shaft 26 to disengage the first epicyclic gearbox 30. Alternatively, the gearbox 28D may be provided with one or more magnetic chip detectors to detect metal particles within the lubricant supply for the first epicyclic gearbox 30, one or more temperature sensors to detect the temperature and hence an increase in the operating temperature of the first epicyclic gearbox 30 or one or more vibration detectors to detect vibrations and hence an increase in vibration of the first epicyclic gearbox 30 as described above.

In each of the embodiments described previously it is possible to provide a first clutch comprising a releasable locking mechanism and/or to provide a second clutch comprising a releasable locking mechanism. An exemplary first clutch 54 with a releasable locking mechanism 54A and an exemplary second clutch 56 with releasable locking mechanism 56A is shown in FIG. 4. The releasable locking mechanism or releasable locking mechanisms may comprise pins or teeth. The releasable locking mechanism of each of these clutches is deployed when the second epicyclic gearbox is operating synchronously with, rotating at the same speed as, the first epicyclic gearbox. The clutches generally operate using friction to transmit torque from the first epicyclic gearbox to the second epicyclic gearbox and the clutches only need sufficient capacity to perform the disengagement and/or engagement between the first and second epicyclic gearboxes. When it is desired to apply significant torque to the second epicyclic gearbox the releasable locking mechanism is engaged and this transmits the torque load.

Gearboxes are arranged to operate most efficiently at their maximum rated capacity. However, in the case of aero gas turbine engines, it is generally the case that the gas turbine engine is operating at capacities far below its maximum level, e.g. take-off. Therefore, it is generally found that a gearbox sized for maximum efficiency at maximum rated capacity, take-off, is roughly twice as inefficient at cruise as a gearbox sized for cruise capacity only.

The advantage of the present disclosure is that both of the epicyclic gearboxes may be used in parallel to transmit maximum power to the fan and with high efficiency and that one of the epicyclic gearboxes if disengaged and the other epicyclic gearboxes is used to transmit reduced power to the fan with high efficiency. This reduces the inefficiency of a gearbox of the present disclosure by about a factor of two compared to a gearbox comprising a single epicyclic gearbox sized for maximum efficiency at maximum rated capacity, take off. The gearbox of the present disclosure is more efficient while operating at reduced power levels compared to a gearbox comprising a single epicyclic gearbox.

Although the present disclosure has been described with reference to the first and second epicyclic gearboxes being provided directly next to each other it is equally possible to provide the first and second epicyclic gearboxes in different locations, for example to provide a desired centre of gravity.

Although the present disclosure has been described with reference to a gearbox comprising first and second epicyclic gearboxes in which one of the epicyclic gearboxes may be engaged or disengaged and a gearbox comprising first, second and third epicyclic gearboxes in which one or two of the epicyclic gearboxes may be engaged or disengaged it is equally possible to provide a gearbox comprising more than three epicyclic gearboxes arranged and working in parallel such that together the epicyclic gearboxes deliver the maximum required power capacity. However, at reduced power capacity one or more of the epicyclic gearboxes is disengaged and the remaining epicyclic gearboxes provide the reduced power capacity with improved efficiency.

In each of the arrangements described above the sun gear, the annulus gear, the planet gear carrier, or star gear carrier, of each epicyclic gearbox and the shaft are coaxial and the axes of the planet gears of each epicyclic gearbox are arranged parallel to the axis of the epicyclic gearbox. In each of the arrangements described above the sun gear of each of the epicyclic gearboxes have the same outer diameter and the annulus gear of each of the epicyclic gearboxes have the same inner diameter, e.g. each of the epicyclic gearboxes in an arrangement is substantially the same.

Although only FIG. 8 shows an arrangement where the annulus gear of each of the other two epicyclic gearboxes is directly clutched to the annulus gear of the first, central or main, epicyclic gearbox, in the other arrangements the annulus gear of one epicyclic gear is clutched to the annulus gear of the first, main, epicyclic gearbox via the annulus gear, or annulus gears, of one or more intervening epicyclic gearboxes each of which has its annulus gear clutched to the annulus gear of the first, main, epicyclic gearbox and thus the annulus gear of each of the other epicyclic gearboxes is clutched to the annulus gear of the first, main, epicyclic gearbox. Similarly, in the other arrangements shown in FIG. 7 the planet gear carrier of one epicyclic gear is clutched to the planet gear carrier of the first, main, epicyclic gearbox via the planet gear carrier, or planet gear carriers, of one or more intervening epicyclic gearboxes each of which has its planet gear carrier clutched to the planet gear carrier of the first, main, epicyclic gearbox and thus the planet gear carrier of each of the other epicyclic gearboxes is clutched to the planet gear carrier of the first, main, epicyclic gearbox.

The arrangement of sensors and clutch on the first sun gear of the first epicyclic gearbox shown in FIG. 3 may also be applied to the gearbox arrangements in FIGS. 4, 6, 7 and 8.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox. The propulsor may be a fan or a propeller.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The project leading to this application has received funding from the Clean Sky 2 Joint Undertaking under the European Union's Horizon 2020 research and innovation programme under grant reference No. CS2-ENG-GAM-2014-2015-01.

The invention claimed is:

1. A gas turbine engine comprising a gearbox, the gearbox comprising a plurality of epicyclic gear sets,
   each epicyclic gear set comprising a sun gear, an annulus gear, a plurality of planet gears and a planet gear carrier, each planet gear of each epicyclic gear set being rotatably mounted in the planet gear carrier of the corresponding epicyclic gear set by at least one planet gear bearing, each epicyclic gear set being arranged such that the sun gear meshes with the planet gears and the planet gears mesh with the annulus gear,
   an input shaft being arranged to drive the sun gear of one of the epicyclic gear set,
   one of the annulus gear and the planet gear carrier of said one of the epicyclic gear sets being arranged to drive a propulsor,
   the other one of the planet gear carrier and the annulus gear of said one of the epicyclic gear sets being fixed to a static structure,
   at least one first clutch, the at least one first clutch being arranged between (a) the annulus gear of said one of the epicyclic gear sets and the annulus gear of one of the other epicyclic gear sets, or (b) the planet gear carrier of said one of the epicyclic gear sets and the planet gear carrier of one of the other epicyclic gear sets, and
   at least one further clutch, the at least one further clutch being arranged between the sun gear of one of the other epicyclic gear sets and the input shaft.

2. The gas turbine engine as claimed in claim 1 wherein the planet gear carrier of each epicyclic gear set is fixed to the static structure,
the input shaft is arranged to drive the sun gear of said one of the epicyclic gear sets,
the annulus gear of said one of the epicyclic gear sets is arranged to drive the propulsor,
the at least one first clutch is arranged between the annulus gear of said one of the epicyclic gear sets and the annulus gear of one of the other epicyclic gear sets and the at least one further clutch is arranged between the sun gear of one of the other epicyclic gear sets and the input shaft.

3. The gas turbine engine as claimed in claim 1 wherein the annulus gear of each epicyclic gear set is fixed to the static structure,
the input shaft is arranged to drive the sun gear of said one of the epicyclic gear sets,
the planet gear carrier of said one of the epicyclic gear sets is arranged to drive the propulsor,
the at least one first clutch is arranged between the planet gear carrier of said one of the epicyclic gear sets and the planet gear carrier of one of the other epicyclic gear sets and the at least one further clutch is arranged between the sun gear of one of the other epicyclic gear sets and the input shaft.

4. The gas turbine engine as claimed in claim 1 wherein the first clutch is a friction clutch.

5. The turbine engine as claimed in claim 4 wherein the first clutch comprises a releasable locking mechanism.

6. The gas turbine engine as claimed in claim 5 wherein the releasable locking mechanism is selected from the group consisting of pins and teeth.

7. The gas turbine engine as claimed in claim 1 wherein the further clutch is a friction clutch.

8. The gas turbine engine as claimed in claim 7 wherein the further clutch comprises a releasable locking mechanism.

9. The gas turbine engine as claimed in claim 8 wherein the releasable locking mechanism is selected from the group consisting of pins and teeth.

10. The gas turbine engine as claimed in claim 1 wherein a bearing is arranged between the sun gear of one of the other epicyclic gear sets and the input shaft.

11. The gas turbine engine as claimed in claim 1 wherein a third clutch is arranged between the sun gear of said one of the epicyclic gear sets and the input shaft.

12. The gas turbine engine as claimed in claim 1 wherein at least one sensor is provided to detect wear, or malfunction, of the one of the epicyclic gear set.

13. The gas turbine engine as claimed in claim 12 wherein the at least one sensor is selected from the group consisting of a magnetic chip detector, a temperature sensor and a vibration detector.

14. A gas turbine engine comprising a gearbox, the gearbox comprising a first epicyclic gear set and a second epicyclic gear set,
the first epicyclic gear set comprises a first sun gear, a first annulus gear, a plurality of first planet gears and a first planet gear carrier, each first planet gear is rotatably mounted in the first planet gear carrier by at least one planet gear bearing, the first sun gear meshes with the first planet gears and the first planet gears mesh with the first annulus gear,
the second epicyclic gear set comprises a second sun gear, a second annulus gear, a plurality of second planet gears and a second planet gear carrier, each second planet gear is rotatably mounted in the second planet gear carrier by at least one planet gear bearing, the second sun gear meshes with the second planet gears and the second planet gears mesh with the second annulus gear,
the input shaft is arranged to drive the first sun gear,
the first planet carrier is arranged to drive a propulsor,
the first annulus gear is fixed to a static structure,
a first clutch is arranged between the first planet gear carrier and the second planet gear carrier, a second clutch is arranged between the second sun gear and the input shaft, and a bearing is arranged between the second sun gear and the input shaft.

15. The gas turbine engine as claimed in claim 14 wherein a load sharing mechanism is provided between the second annulus gear and the static structure.

16. The gas turbine engine as claimed in claim 15 wherein the load sharing device is selected from the group consisting of a hydraulic load sharing mechanism, an electro-mechanical load sharing mechanism, and a spring/stiffness based load sharing mechanism.

17. The gas turbine engine as claimed in claim 16 wherein the load sharing mechanism is a hydraulic load sharing mechanism, the hydraulic load sharing mechanism comprises a plurality of cylinders, a plurality of pistons and a supply of hydraulic fluid, the axes of the cylinders are arranged tangentially to the second annulus gear, each piston is arranged within a corresponding one of the cylinders to define a corresponding chamber and the chambers are connected to the supply of hydraulic fluid.

18. The gas turbine engine as claimed in claim 14 wherein the first planet gear carrier comprises a first ring, a second ring spaced axially from the first ring, and a plurality of circumferentially spaced axles extending axially between the first ring and the second ring, each first planet gear being rotatably mounted on a respective one of the axles.

19. The gas turbine engine as claimed in claim 18 wherein each first planet gear is rotatably mounted on the first planet gear carrier by a bearing selected from the group consisting of a journal bearing and at least one roller bearing.

20. The turbine engine as claimed in claim 14 wherein the second planet gear carrier comprises a first ring, a second ring spaced axially from the first ring, and a plurality of circumferentially spaced axles extending axially between the first ring and the second ring, each second planet gear being rotatably mounted on a respective one of the axles.

21. The turbine engine as claimed in claim 20 wherein each second planet gear is rotatably mounted on the second planet gear carrier by a bearing selected from the group consisting of a journal bearing and at least one roller bearing.

22. A gas turbine engine comprising a gearbox, the gearbox comprising a first epicyclic gear set and a second epicyclic gear set,
the first epicyclic gear set comprises a first sun gear, a first annulus gear, a plurality of first planet gears and a first planet gear carrier, each first planet gear is rotatably mounted in the first planet gear carrier by at least one planet gear bearing, the first sun gear meshes with the first planet gears and the first planet gears mesh with the first annulus gear,
the second epicyclic gear set comprises a second sun gear, a second annulus gear, a plurality of second planet gears and a second planet gear carrier, each second planet gear is rotatably mounted in the second planet gear carrier by at least one planet gear bearing, the second sun gear meshes with the second planet gears and the second planet gears mesh with the second annulus gear, the input shaft is arranged to drive the first sun gear, the first annulus gear is arranged to drive a propulsor, the first planet gear carrier is fixed to the static structure, the second planet gear carrier is fixed to the static structure, a first clutch is arranged between the first annulus gear and the second annulus gear, and a second clutch is arranged between the second sun gear and the input shaft.

* * * * *